Figure 1:
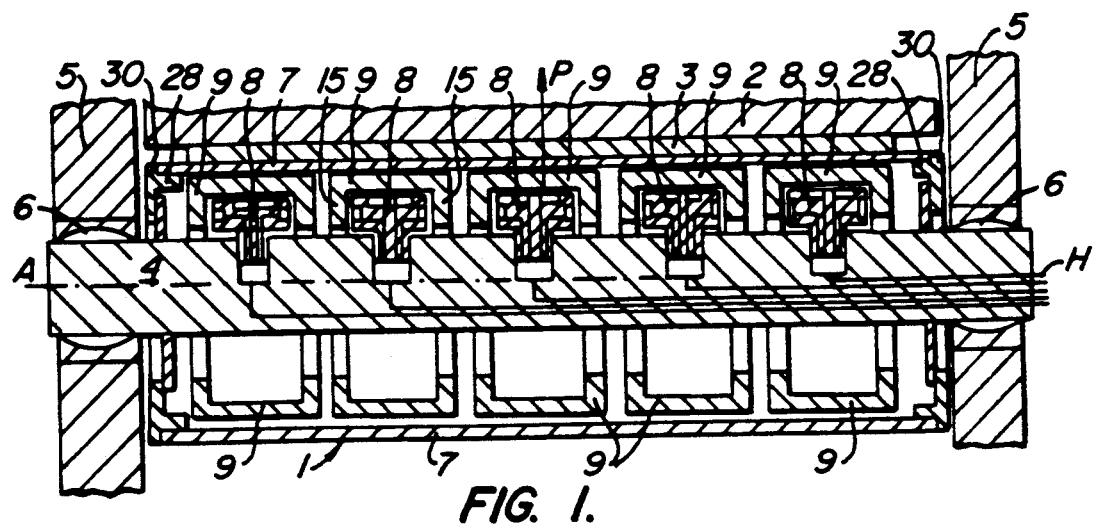

United States Patent
Lehmann

[11] Patent Number: 5,290,223
[45] Date of Patent: Mar. 1, 1994

[54] DEFLECTION CONTROLLED ROLL

[75] Inventor: Rolf Lehmann, Rudolfstetten, Switzerland

[73] Assignee: Sulzer-Escher Wyss GmbH, Ravensburg, Fed. Rep. of Germany

[21] Appl. No.: 48,443

[22] Filed: Apr. 15, 1993

[30] Foreign Application Priority Data

Sep. 4, 1992 [CH] Switzerland ............. 02778/92

[51] Int. Cl.⁵ ............................................. B21B 27/00
[52] U.S. Cl. ..................................... 492/7; 492/2; 492/5; 492/6
[58] Field of Search ............ 492/2, 5, 6, 7, 16–20; 384/99, 100

[56] References Cited

U.S. PATENT DOCUMENTS

| | | | |
|---|---|---|---|
| 4,262,400 | 4/1981 | Miesch | 492/7 |
| 4,518,460 | 5/1985 | Hauser et al. | 492/7 |
| 4,757,585 | 7/1989 | Niskamen | 492/7 |
| 4,864,703 | 9/1989 | Biondetti et al. | 492/7 |
| 5,033,176 | 7/1991 | Schiel | 492/7 |
| 5,044,273 | 9/1991 | Brendel | 492/7 |
| 5,206,978 | 5/1993 | Pau | 492/7 |

Primary Examiner—Irene Cuda
Attorney, Agent, or Firm—Townsend and Townsend Khourie and Crew

[57] ABSTRACT

In a deflection controlled roll (1) having a non-rotatable carrier (4), a rotatable roll jacket (7) is supported against the carrier (4) by a number of hydrostatic supporting elements (8) with adjustable pressing force. The supporting elements (8) run in corotating bearing races (9) mounted loosely in the roll jacket (7) and corotating with the roll jacket (7) but independently therefrom. These bearing races (9) are provided on both sides with flanks (15) for axial positioning, which cooperate with side bearing pockets on the supporting element (8) and form an axial guideway for the bearing race (9). Automatic positioning with maintenance of a defined bearing gap is achieved by a toroidal cross-sectional or a tapered ring-shaped construction of the running surfaces of the supporting element (8) and the bearing race (9).

10 Claims, 2 Drawing Sheets

DEFLECTION CONTROLLED ROLL

The invention relates to a deflection controlled roll having a roll jacket which is rotatable about a non-rotatable carrier, the roll jacket being supported against the carrier by at least one hydraulic supporting element, which is mounted by means of at least one hydrostatic bearing pocket on a bearing race corotating loosely in the roll jacket and exerting a pressing force on the roll jacket via the bearing race.

Such a deflection controlled roll is known for example from EP-A-141 141. In this roll a pressing force is exerted on the roll jacket by the hydraulic supporting element, and thereby on a web passing between the roll jacket and an opposing element. The supporting elements being provided therein with hydrostatic bearing pockets on their bearing surfaces, which allow for a near friction-free running of the supporting elements on bearing races which are mounted loosely in the roll jacket. These bearing races have a somewhat smaller outside diameter than the inside diameter of the roll jacket, so that they corotate independently of the roll jacket. As a result of these bearing races, considerably larger pressing forces can be exerted via the supporting elements, or alternatively higher line forces (force per unit length) on the roll jacket in the range above 1000N/mm, without it deforming unacceptably. Conversely, the bearing races allow the use of a thinner roll jacket, which thus displays an improved flexibility in the axial direction and thereby also a better individual control of the line force over the length of the roll jacket with a reduced coupling effect on adjacent supporting elements, even for considerably higher pressing forces.

It is herein disadvantageous that the loosely mounted bearing races are not fixed in their position in the axial direction. Their movement in the roll interior is thereby undefined and uncontrolled, in particularly when the individual supporting elements are somewhat spaced apart from each other in the axial direction. To solve this problem, it has already been proposed to position distancing pieces between the individual bearing races in the axial direction or by connecting the individual bearing races with each other by flexible elements. However, this requires the maintenance of exact tolerances and the exact adjustment of the bearing races relative to each other and to the supporting elements and does not allow efficient and rapid assembly of such a roll, without considering the proneness to break down resulting from distortion caused by the forces present and thermal strains which occur during operation of deflection controlled rolls. Also provision of running grooves for the bearing races on the inner side of the roll jacket requires much effort and that every roll jacket be individually fitted, in particular when exchanging same.

The object of the invention is to overcome the above described disadvantages of the prior art and in particular to develop a deflection contolled roll of the above named kind so that the corotating bearing races loose in the roll take up a defined position and in particular that they adjust themselves automatically to the position of the supporting elements. As well as fixation of the axial position an avoidance of slewing and tilting movement of the bearing races should be achieved.

According to the invention this object is satisfied by equipping the supporting element with at least one hydraulic bearing surface which forms an angle with the axial direction of the roll jacket, and by providing the bearing race with a running surface which cooperates with this bearing surface and is similarly oriented, and which forms an axial guideway for the bearing race together with the bearing surface of the supporting element.

The additional bearing surfaces which form an angle with the axial direction can thereby also be provided with hydrostatic bearing pockets, or be hydro-dynamically lubricated by the pressure fluid emitted from bearing pockets oriented in the pressing direction.

The bearing surfaces of the supporting element, or alternatively the running surfaces of the bearing race, which effect the axial guidance of the bearing race, can be arranged approximately perpendicular to the axle and provided additionally to bearing surfaces or running surfaces which are oriented in the direction of the axle over which the pressing force is exerted.

However, bearing surfaces or running surfaces oriented tilted relative to the axle may also be provided, which convey the pressing force as well as effecting an axial guidance of the bearing race as a result of their directional component which diverges from the axial direction. It is advantageous therein if the bearing surfaces have a toroidal cross-sectional form, so that tilting of the supporting element relative to the roll jacket axis arising from carrier deflection under loading can be caught, and jamming of the supporting element be avoided. Provision of tapered bearing surfaces allows automatic alignment of the supporting parts and an even bearing gap to be achieved.

In an advantageous development of the invention to hinder tilting and slewing movement and jamming of the bearing races, on the one hand the supporting elements are constructed to be non-rotatable in their supporting direction, for instance through a suitable construction of their piston-cylinder guideway, and on the other hand the axial breadth of the bearing races and the length of the periphery of the guiding surfaces of the supporting elements are chosen to be sufficiently large in comparison to the diameter of the bearing race.

It is particularly advantageous to provide stops at the ends of the roll jacket for the outermost bearing races, thereby making the axial bearing for the roll jacket redundant and dispensable, since the relative speed between the roll jacket and the corotating ring is zero or so small that the difference can be taken up simply by sliding friction without the necessity of having to provide a bearing. Positioning of the roll jacket in the radial direction is achieved by the outermost supporting element in cooperation with the respective bearing race, thereby dispensing with a separate arrangement of bearings.

Figure 3A:
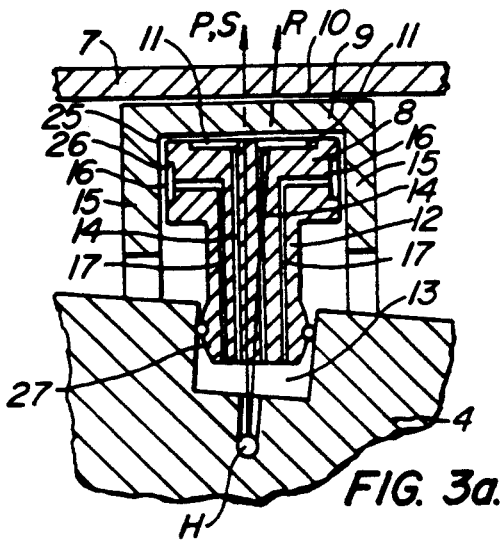
Figure 3B:
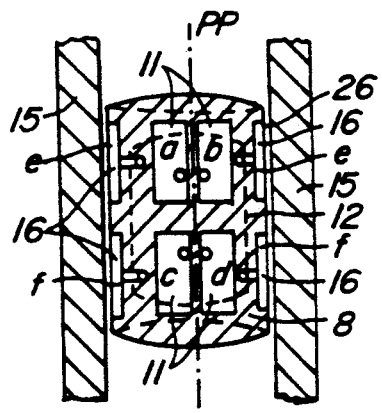
Figure 4A:
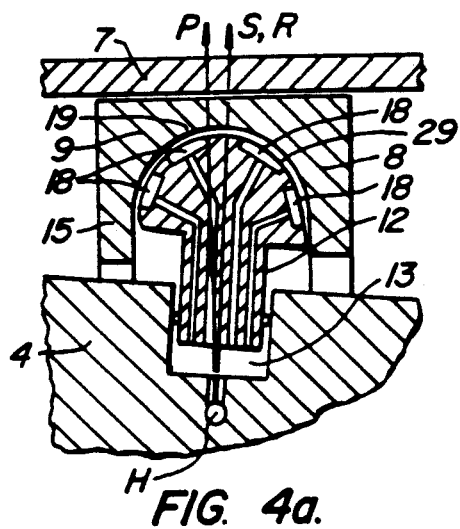
Figure 4B:
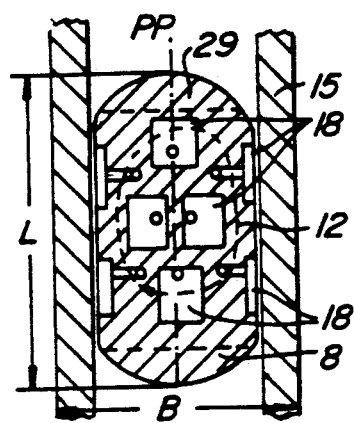
Figure 2:
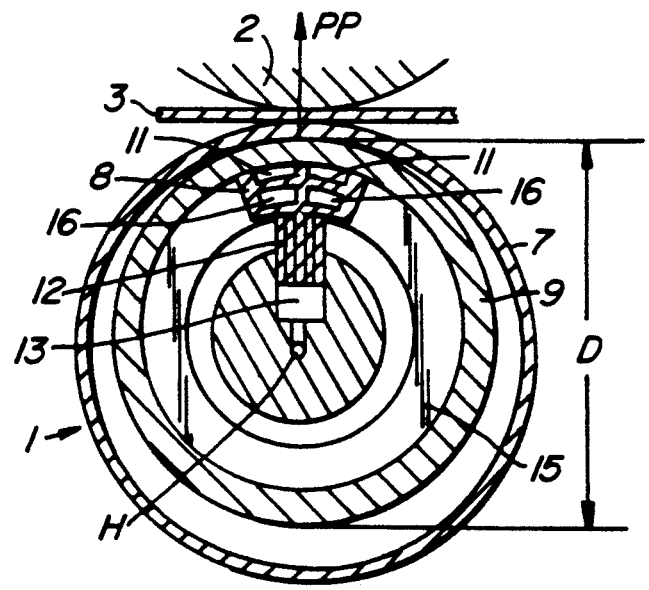
Figure 5:
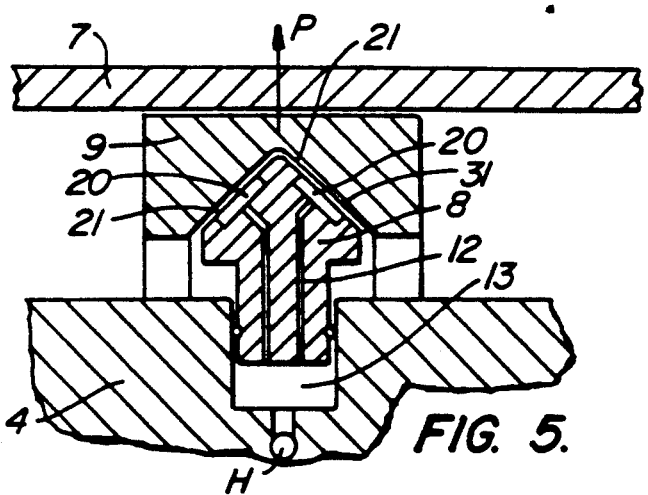
Figure 6:
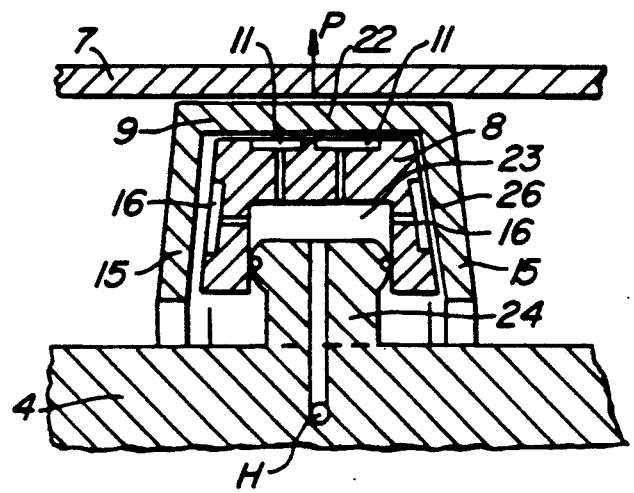

The invention is explained, by means of example only, by the embodiments shown in the figures, which show:

FIG. 1 a roll arrangement with a deflection controlled roll in axial cross-section in the pressing plane, FIG. 2 a deflection controlled roll in radial cross-section, FIG. 3 A and B a first embodiment of a supporting element with associated bearing race with a section in the pressing plane and perpendicular thereto, FIG. 4 A and B a second embodiment of a supporting element with a section in the pressing plane and perpendicular thereto, FIG. 5 a third embodiment of a supporting element with a section in the pressing plane and FIG. 6 a fourth embodiment of a supporting element with a section in the pressing plane.

In the roll arrangements shown in FIGS. 1 and 2, a deflection controlled roll 1 exerts a pressing force in a pressing direction P, or alternatively a pressing plane PP, on a web 3 passing in-between the deflection controlled roll 1 and an opposing element 2. The opposing element 2 can be an opposing roll of the conventional type or an opposing roll constructed as a deflection controlled roll. The web subject to processing by pressing can for example be a metal belt or a metal sheet which is to be rolled to a particular thickness, or a paper, cardboard or textile web which is to be subject to processing by pressing, smoothing or pressurization, or another material to be processed.

The deflection controlled roll 1 consists of a non-rotatable carrier 4 which is mounted non-rotatably but slewably in a suitable holding frame 5, for instance with drag bearings 6. A tube shaped roll jacket 7 is rotatable about the carrier 4. A row of hydraulic supporting elements 8 to support this roll jacket 7 are arranged side by side in the axial direction A inside the deflection controlled roll 1, where said supporting elements 8 are hydraulically supported relative to the carrier 4 and exert, under pressurization, a supporting or pressing force in the pressing plane PP on the roll jacket 7 or alternatively via the roll jacket 7 on the web 3. These supporting elements can, as for example described in U.S. Pat. No. 3,802,044, be implemented as hydrostatic supporting elements or in other suitable ways. The supporting elements 8 can be individually supplied with different pressures via feedthroughs H, so that individual pressing forces, i.e. a particular pressing force profile, can be produced along the roll axis A or alternatively along the width of the web 3.

The supporting elements 8 do not however act directly on the roll jacket 7, rather via in each case the corresponding individual bearing race 9, the outside diameter of which being somewhat smaller than the inside diameter of the roll jacket 7. The bearing races 9 are thus loosely located in the inside of the roll jacket 7, so that they roll off the inner surface of the roll jacket 7 and corotate together with the roll jacket 7 but with slightly different rotational rates.

As can be seen, in particular in greater detail from FIGS. 3A and B, the bearing races 9 have on the one hand a wide rolling surface 10 with which they roll off the roll jacket and on the other hand the supporting elements 8 are provided on their bearing surfaces with hydrostatic bearing pockets 11 upon which the bearing race 9 is mounted in an almost friction free manner over the width of the supporting element 8. In order to be able to simultaneously exert a pressing force and to achieve a hydrostatic positioning, the supporting element 8 is provided with a piston-like foot 12, which is supported on a pressure volume 13 in the carrier 4, said pressure volume 13 being supplied with hydraulic pressure fluid via the feed H and which is mobile in the supporting direction S, wherein the bearing pockets 11 are supplied with pressure fluid from the pressure volume 13 via constriction borings 14.

By subdividing the running surface for the supporting elements 8 into a number of bearing races 9 which rotate independently from one another and from the roll jacket 7, it is thereby achieved that the main part of the deformation under application of the pressing force of the supporting element 8 is taken up by the bearing races 9 and that the wall strength of the actual roll jacket 7 can be chosen to be so small that sufficiently good transverse flexbility as well as peripheral flexibility of the roll jacket can be achieved. This allows the use of thinner and more flexible roll jackets with considerably increased pressure forces or line forces which can be made from metal, plastic or suitable elastomers, corresponding to the web to be processed. The area of applicability for deflection controlled rolls is thereby considerably extended.

To achieve this goal it is important that the bearing races 9 are so constructed that they are able to revolve loosely in the roll jacket interior even under deformation caused by the pressing force of the supporting elements 8. The difference in diameter between the bearing races 9 and the roll jacket 7 is to be so chosen that the maximal forces are taken up as much as is possible by the bearing races 9 and so that the roll jacket 7 itself deforms as little as possible.

In order to be able to inhibit axial displacement of the loose corotating bearing races 9 and thereby the ensuing hindering of each others' rotation, in particular as a result of deflection of the carrier 4 arising from loading, it is necessary, even under extreme conditions, to retain a certain distance between the bearing races 9 and the individual supporting elements 8. It is also necessary to fix the bearing races in their axial position. To this end, the bearing races 9 are provided on both sides with circular ring-shaped side flanks 15 which possess running surfaces for correspondingly oriented bearing surfaces 26 of the supporting elements. These bearing surfaces 26 can be hydro-dynamically lubricated by pressure fluid emitted from the bearing pocket 11 or be equipped with additional hydrostatic bearing pockets 16 so that the bearing surfaces 26 at the side edge of the supporting element 8 also form a hydrostatic almost friction-free axial guideway for the bearing race 9. The bearing race 9 is thus radially guided by the hydrostatic bearing pockets 11 which are oriented in the axial direction, whereas the bearing race 9 is axially guided by the side bearing areas 26 or alternatively bearing pockets 16 which are oriented perpendicular to the roll axis A. The constriction bores 14 for the bearing pockets 11 and the constriction bores 17 for the side bearing pockets 16 can be chosen with reference to their flow resistance according to the desired bearing gap and may also be different.

The flanks 15 of the bearing races 9 lead to further reduction of the deformation of the bearing races 9 under load so that still greater forces may be taken up, or the wall strength of the bearing race can be reduced.

In order to inhibit a tilting of the bearing surfaces and a jamming of the supporting element 8 it is advantageous to provide a plurality of independently fed bearing pockets adjacent to one another on the bearing surfaces. Thus for example FIG. 3B shows a supporting element 8 whose axially and circumferentially directed radial bearing surfaces each possess two independent bearing pockets A, B, C, D, and whose side bearing surfaces each possess two adjacent bearing pockets E, F. An automatic positional stabilization of the supporting element 8 with regard to the associated bearing race 9 is hereby achieved.

Furthermore, it can be advantageous particularly with soft roll jackets to prevent rotation of the guiding race 9 about the pressure direction P or the supporting direction S of the supporting element. This can for example thereby be achieved by choosing the cross-section of the piston 12 of the supporting element and the corresponding cross-section of the cylinder boring 13 in the carrier 4 to deviate from a circular form, so that a rotation of the supporting element 8 in the cylinder 13 in the carrier 4 is prevented. This can be achieved for example be choosing an oval or elliptical cross-section for the piston 12 or by corresponding guide elements on the piston and cylinder.

Tipping of the bearing race 9 out of the pressing direction P can be advantageously hindered by choosing the width of the bearing race 9 in the axial direction not to be too narrow and by so choosing the ratio of the diameter D of the bearing race 9 to its width B such that tipping forces are small as possible. For the same reason, the extent L of the supporting element 8 in the circumferential direction should be chosen to be adequately large in comparison to the diameter D of the bearing race 9. Moreover, it is advantageous to construct the foot of the piston 12 of the supporting element in such a way that the supporting element 8 is somewhat tiltable, for instance by providing a thickened portion 27 so that its supporting direction S is able to tilt out of the radial direction R of the cylinder into the pressing direction P and so that it does not exert a tilting moment on the bearing race 9.

FIGS. 4A and B show another embodiment of the supporting element 8 and the bearing race 9, in which the bearing pockets 18 are not oriented in the axial direction or perpendicular thereto, rather are all tilted relative to the axial direction. The bearing surfaces 19 of the supporting element 8 and the running surfaces 29 of the bearing race 9 have a toroidal cross-sectional form, i.e. a thicker portion or channel respectively with a semi-circular shaped cross-section. The bearing pockets 18 are distributed evenly over the surface of the torus, so that also here an automatic positional stabilization of the supporting element 8 in the bearing race 9 is achieved. The advantage of the torus form with semi-circular-like cross-section is above all that the supporting element automatically adjusts itself on the running surface of the bearing race 9 without the possibility that jamming can occur, even during deflection of the carrier 4 under load and a deviation of the supporting direction S out of the pressing direction P caused thereby.

Also in the example shown in FIG. 5, only bearing pockets 20 at the supporting element 8 which extend tilted relative to the axis are provided. These are arranged on tapered ring-shaped bearing surfaces 21 of the supporting element 8 or the corresponding running surfaces 31 of the bearing race 9. The advantage of this is that the supporting element is automatically positioned in the pressing direction P in the bearing race, wherein an even hydrostatic bearing gap automatically adjusts itself between the supporting element 8 and the bearing race 9. The resultant of the two bearing pockets 20 on either side of the supporting element 8 is thereby always directed in the pressing direction P.

If the supporting element 8 has a trapezoidally shaped cross-section in the axial direction, as shown in FIG. 6, a larger pressing force can be exterted on the roll jacket than in FIG. 5. Here, the bearing race 9 has a cylindrical part 22 which rotates off the inner side of the roll jacket 7 and which has tilted flanks 15 with running surfaces 26 on both sides. As in the first described example, the peripheral bearing pockets 11 serve here for the production of pressing force, whereas the side bearing pockets 16 serve to guide the bearing race 9. The advantage is the simplified assembly, since with regard to the width of the supporting elements 8 in the axial direction and the corresponding inner width of the bearing race 9 no such narrow tolerances need to be maintained and even so a problem free location and guiding is achieved.

A further difference is that the cylinder volume 23 which is supplied with pressure fluid, is not located in the carrier 4 rather, conversely, in the supporting element 8, whereas the piston 24 is arranged at the carrier 4. The advantage thereby lies in that the cylinder volume 23 is not deformed during deflection and deformation of the carrier, which is also true for the protrusion 24 on the carrier, so that the piston-cylinder guide of the supporting element 8 has less tendency to jam.

A further advantage of the described deflection controlled roll with automatically positioning bearing races 9, lies in that both the outer bearing races can be used for axial positioning of the roll jacket 7 in a simple manner. For this purpose a built-in piece 30 is inserted into either end of the roll jacket 7, said built-in piece 30 having a shell-shaped cylindrical web 28 which is positioned on the inner side of the roll jacket 7 and the end of which reaches up to very close to the corresponding outer bearing race 9, thereby forming an abutment for the outer bearing races. Because at the press gap the ring shaped web 28 rotates synchronously with, i.e. at the same speed as, the roll jacket 7 (as well as the bearing race 9 rotating there), no friction is present even during contact, whereas at other positions of the circumference either the relative speed between the web 28 and the outer bearings 9 is very small, and therefore also the friction, or as a result of the difference in diameter between the bearing race 9 and the web 28 no contact takes place. Because the roll jacket 7 is axially guided by the built-in pieces 25 in cooperation with the outer bearing races 9 and because it is radially located by means of the supporting elements 8, an axial arrangement of bearings for the described deflection controlled roll can be completely dispensed with. Moreover, the roll jacket 7 is freely mobile in the pressing direction even at its ends, without complicated arrangements being necessary such as for example linking guideways positioned by roll bearings or similar as known from U.S. Pat. No. 3,885,283.

What is claimed is:

1. Deflection controlled roll (1) having a roll jacket (7) which is rotatable about a non-rotatable carrier (4), said roll jacket (7) being supported against said carrier (4) by at least one hydraulic supporting element (8), which is mounted by means of at least one hydrostatic bearing pocket (11, 18, 20) on a bearing race (9) corotating loosely in said roll jacket (7) and exerting a pressing force on said roll jacket (7) via said bearing race (9), characterized in that said supporting element (8) has at least one hydraulic bearing surface (19, 21, 26) which forms an angle with the axial direction (A) of said roll jacket (7) and in that said bearing race (9) has a similarly oriented running surface (25, 29, 31) cooperating with the bearing surface which, together with the bearing surface of said supporting element (8), forms an axial guideway for said bearing race (9).

2. Deflection controlled roll as set forth in claim 1, characterized in that at least one hydraulic bearing surface (26) of the supporting element (8) as well as the running surface (25) of the bearing race (9) cooperating therewith is oriented perpendicular to the axial direction (A).

3. Deflection controlled roll as set forth in claim 2, characterized in that running surfaces (25) oriented perpendicular the axial direction (A) are provided on both sides of circular ring-shaped flanks (15) provided on the bearing race (9).

4. Deflection controlled roll as set forth in claim 1, characterized in that at least one part of the bearing surfaces (29, 31) of the supporting element (8) and a corresponding part of the running surfaces (19, 26) of the bearing race (9) are oriented tilted relative to the axial direction (A).

5. Deflection controlled roll as set forth in claim 4, characterized in that the bearing surfaces (21) of the supporting element (8) and the corresponding running surfaces (31) of the bearing race (9) are provided on a tapered ring-shaped surface.

6. Deflection controlled roll as set forth in claim 4, characterized in that the bearing surface (19) of the supporting element (8) and the running surface (29) of the bearing race (9) possess the form of a toroidal section with a semicircular-like cross-section.

7. Deflection controlled roll as set forth claim 1, characterized in that the bearing surfaces (19, 21, 26) of the supporting elements (8) have hydrostatic bearing pockets (11, 16, 18, 20) which are supplied with pressure fluid.

8. Deflection controlled roll as set forth claim 1, characterized in that the bearing surfaces of the supporting elements (8) which are oriented in the pressing direction possess hydrostatic bearing pockets (11), whereas the side bearing surfaces (16) which form an angle with the axial direction (A) are hydrodynamically lubricated by pressure fluid emitted from the hydrostatic bearing pocket (11).

9. Deflection controlled roll as set forth in claim 1, characterized in that abutments (28) are provided at the ends of the roll jacket (7) for the outermost bearing races (9) to axially guide the roll jacket (7).

10. Deflection controlled roll as set forth in claim 9, characterized in that the abutments (28) for the outermost bearing races (9) are arranged on a cylindrical collet (30) located on the inner side of the roll jacket (7) and which rotates with the roll jacket (7).

* * * * *